(12) United States Patent
Tsang et al.

(10) Patent No.: US 7,460,009 B2  
(45) Date of Patent: Dec. 2, 2008

(54) LIGHT SOURCE OF TESTING LIGHT SENSOR, TEST APPARATUS AND METHOD

(75) Inventors: Koon Wing Tsang, Sindian (TW); Chih-Cheng Chien, Sindian (TW)

(73) Assignee: Capella Microsystems Corp., Taipei County (TW)

(*) Notice: Subject to any disclaimer, the term of this patent is extended or adjusted under 35 U.S.C. 154(b) by 205 days.

(21) Appl. No.: 11/483,633

(22) Filed: Jul. 11, 2006

(65) Prior Publication Data

US 2007/0208525 A1    Sep. 6, 2007

(51) Int. Cl.  
*G08B 29/00* (2006.01)

(52) U.S. Cl. .................... 340/514; 702/116

(58) Field of Classification Search ............ 340/514, 340/641, 635, 656, 654; 324/414, 133, 556; 702/116; 315/135, 133, 129  
See application file for complete search history.

(56) References Cited

U.S. PATENT DOCUMENTS

| | | | | |
|---|---|---|---|---|
| 5,471,303 A | * | 11/1995 | Ai et al. | 356/497 |
| 5,557,207 A | * | 9/1996 | Duve | 324/414 |
| 5,576,537 A | * | 11/1996 | Holzapfel et al. | 250/237 G |
| 5,612,780 A | * | 3/1997 | Rickenbach et al. | 356/73.1 |
| 6,351,079 B1 | * | 2/2002 | Willis | 315/200 A |

* cited by examiner

*Primary Examiner*—Anh V La  
(74) *Attorney, Agent, or Firm*—Rosenberg, Klein & Lee

(57) ABSTRACT

A light source of testing a sensor, a test apparatus and a method are disclosed. The test apparatus includes a light source, a photo-mask and a sensor bearing area. The light source includes a plurality of light emitting diodes with parallel connection for emitting a test light. The light source is disposed in a photo-mask. The photo-mask has a diffuser interface. The test light is then diffused to the outside of the photo-mask through the diffuser interface. The sensor bearing area is for bearing the sensor. The sensor bearing area is disposed at the outside of the photo-mask and locates at a position to enable the test light to reach. Therefore, the test light emitted by the light source is used to test the sensor.

25 Claims, 6 Drawing Sheets

LIGHT SOURCE OF TESTING LIGHT SENSOR, TEST APPARATUS AND METHOD

FIELD OF THE INVENTION

The present invention relates to a light source of testing a light sensor, a test apparatus and a method and, more particularly, to utilize a plurality of Light Emitting Diodes with parallel connection to be the light source of testing the light sensor, the test apparatus and the method.

BACKGROUND OF THE INVENTION

Currently, in a test technique for an image sensor, a test light is usually projected onto the image sensor. Sensed image data is transmitted by the image sensor to a processor. The image sensor is calibrated based on the test light conditions. If there is an error in the test light source, the image quality of the sensor is greatly affected. Therefore, the test light source characteristics must be very stable. The test light optical spectrum should not change with the driving current and voltage. The output intensity should not change with the temperature. The operation cycles of the light source should be more than 10K hours.

However, the light source for use in emitting the test light, its optical properties may be influenced by external driving circuits so as to produce flickers for the test light, darkness, or generated too much heat for the light source. For instance, a Cold Cathode Fluorescent Light (CCFL) can be taken into the light source for a thin-film transistor liquid-crystal display (TFT LCD). However, CCFL is a temperature sensitive component and the brightness changed with the ambient temperature. The second instance, the brightness of a fluorescent light may dim in cold weather. Furthermore the fluorescent light has flicker noise. The third instance, a calibrated incandescent or halogen light generates excessive heat and its lifetime is shorter. A calibrated incandescent light source has a typical of 100 operating hours. In addition, the incandescent light is multidirectional radiators. Thus, reflectors are needed. All the aforesaid light sources are not suitable for the test technique of the sensor in the mass production environment.

Moreover, White Light Emitting Diode (WLED) with serial connection has longer lifetimes, stable brightness and its radiation angle is less than 30°. Therefore, the WLED is a better choice for the light source of testing a sensor. However, the WLED with serial connection must serial connect seven-WLED in order to satisfy the test requirement for the brightness of the test light. The serial seven-WLED needs 22~24V forward voltages. If a direct current/direct current booster is used to adjust the forward voltages to 22~24V, the wave form of voltages may produce ripples and the stability of the brightness of the test light is also influenced.

Therefore, to enable the light source to emit a stable test light for ensuring the accuracy of the test outcome, the inventor of the present invention based on years of experience on related optical research invents a light source of testing a sensor, a test apparatus and a method to overcome the foregoing shortcomings of the prior arts.

SUMMARY OF THE INVENTION

Accordingly, the object of the present invention is to provide a light source of testing a sensor, a test apparatus and a method. A plurality of light emitting diodes (LEDs) with parallel connection is utilized to be the light source for emitting a test light steadily.

The test apparatus is utilized to test the quality of a sensor. The test apparatus includes a light source, a photo-mask and a sensor bearing area. The light source includes a plurality of LEDs with parallel connection for emitting the test light. The sensor bearing area could bear the sensor. The light source is disposed inside the photo-mask. The photo-mask includes at least one diffuser interface. The test light is diffused by the diffuser interface to the outside of the photo-mask. The sensor bearing area is disposed at the outside of the photo-mask and is at an ambit where the test light can reach from the photo-mask. Therefore, the test light emitted by the light source could reach the sensor bearing area through the diffuser interface and the sensor can be tested by using the test light.

Moreover, the test apparatus disclosed by the present invention further includes a closed shell and a processor. The closed shell is an opaque material for disposing the light source, the photo-mask, the sensor bearing area and the sensor. The processor is for receiving a test data generated by the sensor. The responsivity of the light sensor is then determined based on the test data.

The light sensor is usually a Charge Coupled Device (CCD) or a Complementary Metal-Oxide Semiconductor (CMOS) photodiode. The photo-mask further includes at least one shell. An inside of the shell is a smooth black material for surrounding the diffuser interface and the light source. The diffuser interface is used to enable the test light to diffuse to the outside of the photo-mask uniformly. The plurality of LEDs is seven-White Light Emitting Diodes (WLED) which receive working current provided by a power supply port to emit the test light. The position allocation of the WLEDs is that one WLED is surrounded by six WLEDs. The spacing between any two WLEDs is equivalence. In addition, the light source includes a resistor adjustment unit. The resistor adjustment unit is coupled between the power supply port and the WLEDs in order to adjust brightness of the test light. Because the light source of the present invention uses the LED with parallel connection, the forward voltage required for the test light can be reduced. A liner voltage regulator is also used. The wave form of voltages would not produce ripple effect after regulating.

Other features and advantages of the present invention and variations thereof will become apparent from the following description, drawings, and claims.

DETAILED DESCRIPTION OF THE PREFERRED EMBODIMENTS

Figure 1:
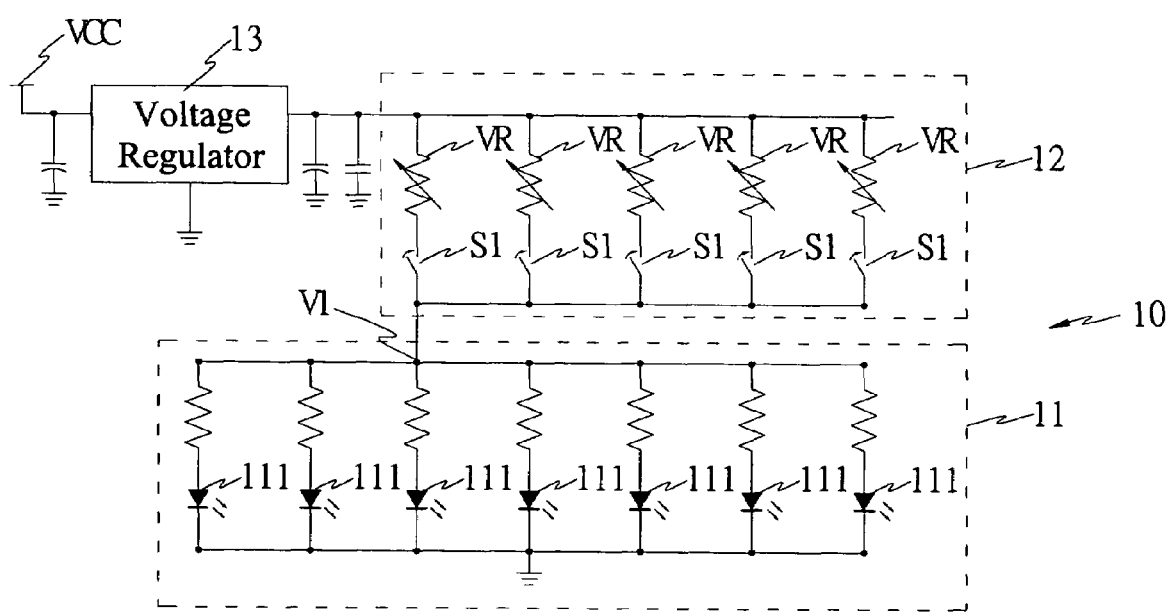
FIG. 1 is a circuit diagram illustrating a light source of testing a sensor according to an embodiment of the present invention.

Referring to FIG. 1, a circuit diagram illustrates a light source of testing a sensor according to an embodiment of the present invention. The light source 10 includes an adjustment unit 12 and a Light Emitting Diode (LED) module 11. The light source 10 receives working current provided by a power supply port VCC through a voltage regulator 13. A test light is then emitted for testing a light sensor. The adjustment unit 12 is for controlling amperes of working current to adjust brightness of the test light. The LED module 11 is a plurality of LEDs 111 with parallel connection. One end of the LEDs 111 is coupled to a ground. Another end is coupled to the adjustment unit 12. Therefore, the LEDs 111 could receive working current adjusted by the adjustment unit 12 to emit the test light.

Moreover, the adjustment unit 12 is composed of five variable resistors VR for fine tuning voltages V1 of a coupled point between the adjustment unit 12 and the LED module 11. In other words, working current is adjusted to change the brightness of the test light. In addition, every variable resistor VR is serial connected to a switch S1. The number of the variable resistors VR can be changed by opening or closing the switch S1 in order to increase the efficiency of voltages V1. The LED is White Light Emitting Diode (WLED). The number of the WLED has better to be seven.

The sensor is a Charge Coupled Device (CCD) or a Complementary Metal-Oxide Semiconductor (CMOS) photodiode. The light source 10 is disposed inside a test apparatus. The test apparatus further includes a photo-mask, a sensor bearing area, a closed shell and a processor. The test light is then utilized to test the light sensor to receive a test data generated by the light sensor. The responsivity of the light sensor is further determined.

Figure 2:
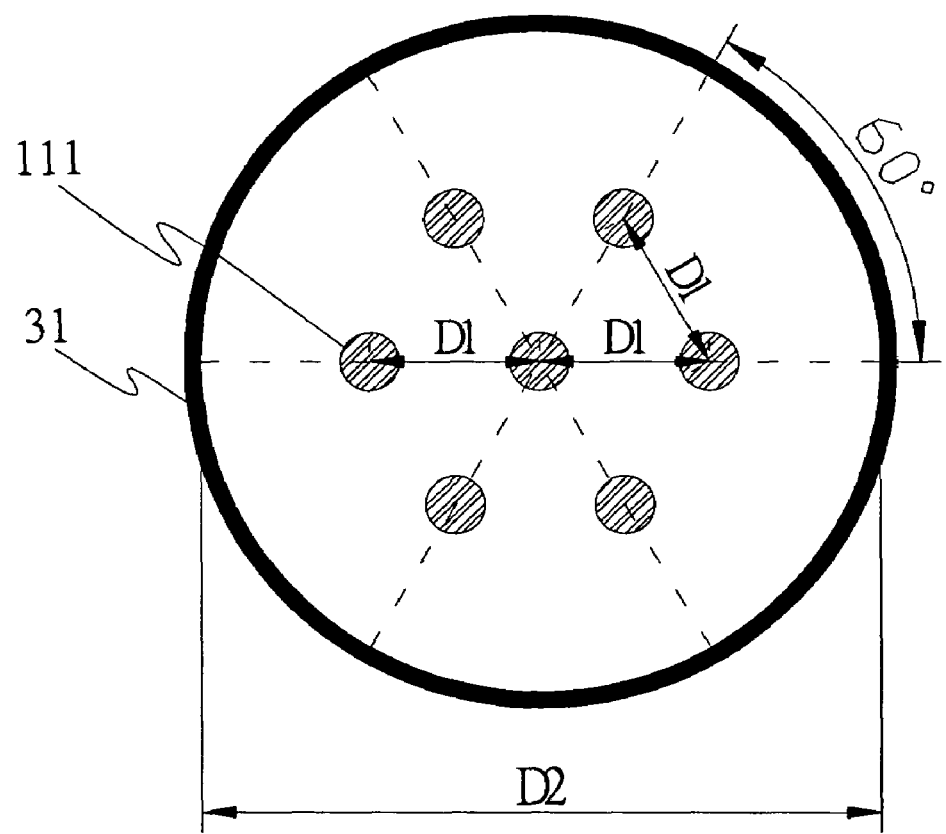
FIG. 2 is a top view illustrating a position allocation of LEDs according to an embodiment of the present invention.
Figure 3:
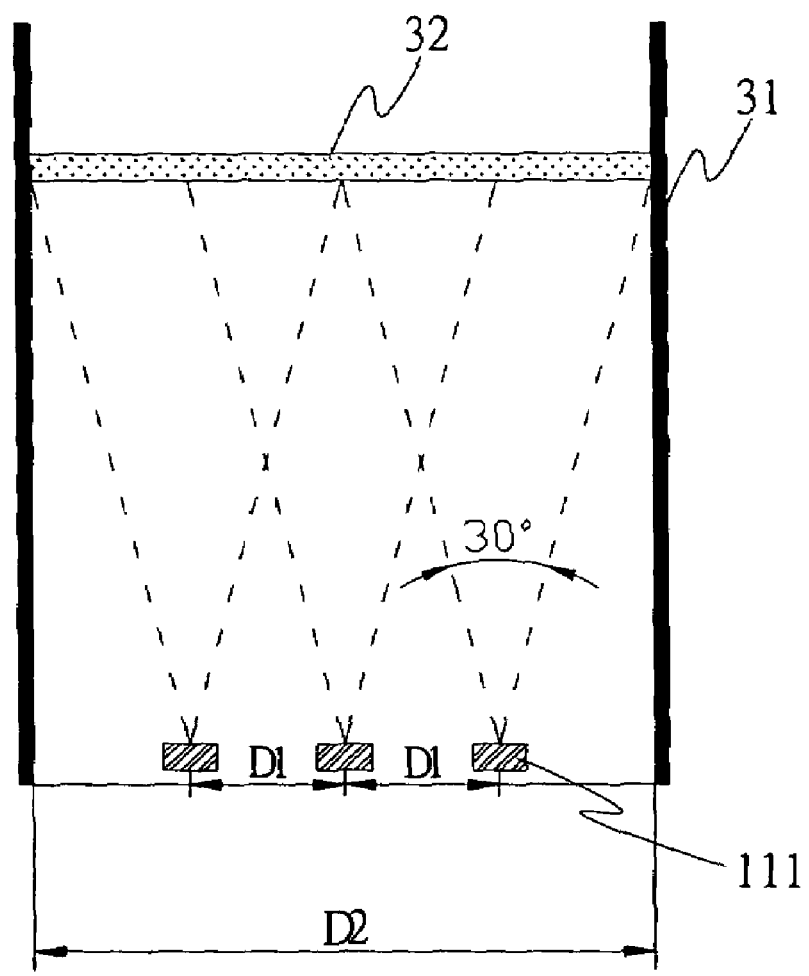
FIG. 3 is a side elevation illustrating a position allocation of LEDs according to an embodiment of the present invention.

Referring to FIG. 2 and FIG. 3, a top view and a side elevation illustrate a position allocation of LEDs according to embodiments of the present invention. In FIG. 2, the position allocation of the LEDs 111 is that one LED 111 is surrounded by six LEDs 111. Any two adjacent LEDs 111 which are at the outside and a central LED 111 are formed 60° included angle. The spacing between two LEDs 11 is D1. In FIG. 3, the angle of the test light emitted by every LED 111 is 30°. The light source 10 could be disposed inside the photo-mask. The photo-mask has a cylinder shell 31 with a diameter D2 and a diffuser interface 32 with a diameter D2. The better position for disposing the diffuser interface 32 is determined through the angle 30° and the diameter D2. There is no need to dispose any reflector.

Figure 4:
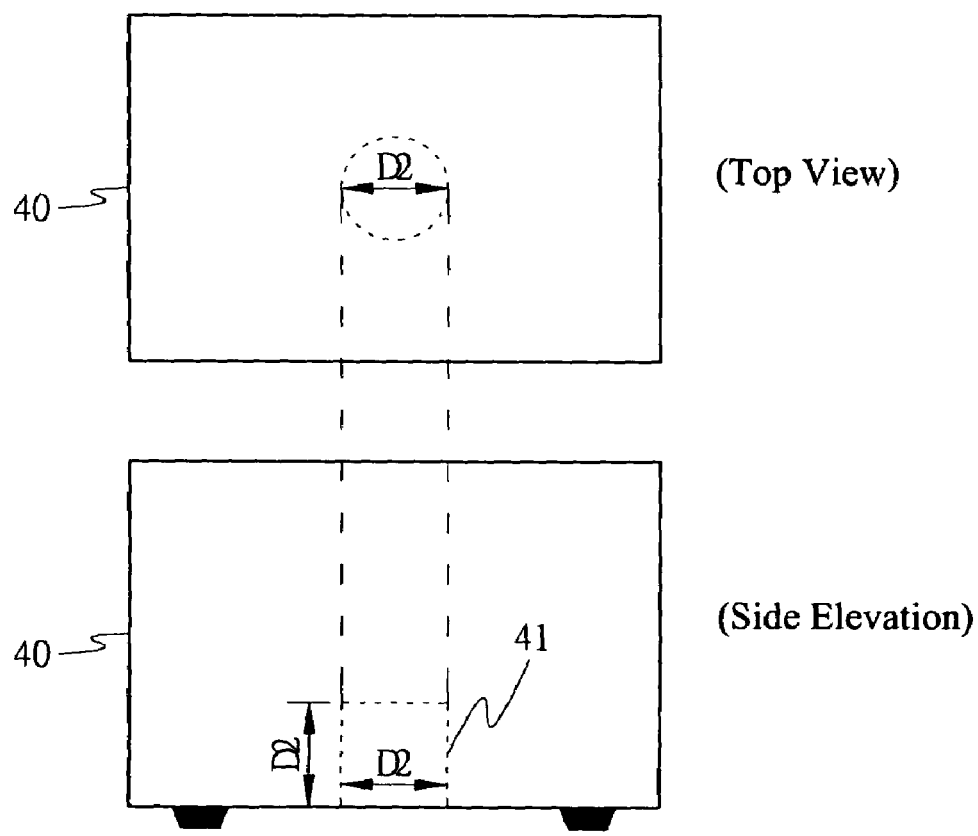
FIG. 4 is a top view and a side elevation illustrating a closed shell of the test apparatus according to an embodiment of the present invention.

Referring to FIG. 4, a top view and a side elevation illustrate the closed shell of the test apparatus according to an embodiment of the present invention. An inside portion of the closed shell 40 is extremely black and smoothly. The closed shell 40 is an opaque material. A central position of the top within the closed shell 40 has a cylinder photo-mask 41. The diameter and the height for the cylinder photo-mask 41 are D2.

Figure 5:
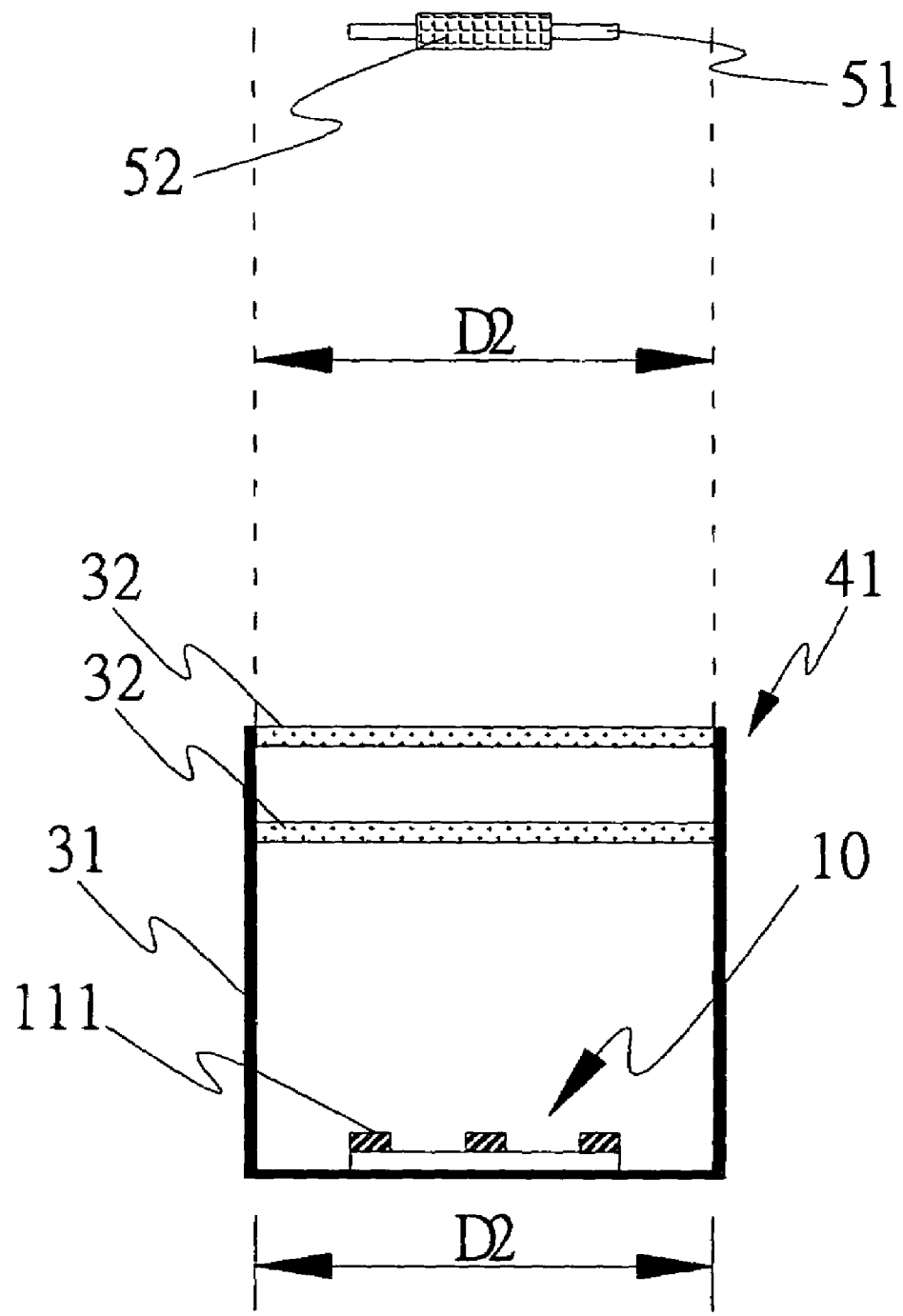
FIG. 5 is a side elevation illustrating a test apparatus according to an embodiment of the present invention.

Referring to FIG. 5 and referring to FIG. 1 to FIG. 4, FIG. 5 is a side elevation illustrates the test apparatus according to an embodiment of the present invention. The test apparatus includes the light source 10, the photo-mask 41 and a sensor bearing area 51. The light source 10 is disposed inside the photo-mask 41. The photo-mask 41 is composed of the cylinder shell 41 and the diffuser interface 32. The sensor bearing area 51 is disposed at the outside of the photo-mask 41 and locates on the diffuser interface 32. The light source 10 has a plurality of LEDs 111 with parallel connection and the adjustment unit 12. The light source 10 is coupled to the voltage regulator 13 in order to receive required working current from the power supply port. The test light is then emitted from the LEDs. An interior wall of the cylinder shell 31 is a smooth black material for surrounding the diffuser interface 32 and the light source 10. The test light may not be diffused to the outside of the photo-mask 41 from the shell 31. The diffuse interface 32 is for uniformly diffusing the test light. The diffuse interface 32 could help the test light to diffuse to the outside of the photo-mask 41. The brightness of the test light which is diffused to the outside of the photo-mask 41 is identically. The sensor bearing area 51 is for bearing a light sensor 52. The light sensor 52 then receives the test light to generate a test data.

In addition, as shown in FIG. 1, the adjustment unit 12 is composed of five variable resistors VR with parallel connection. The adjustment unit 12 is for adjusting working current to change the brightness of the test light. Every variable resistor VR is serial connected to a switch S1 in order to increase the efficiency of voltages V1. The LED is White Light Emitting Diode (WLED). The number of the WLED has better to be seven. A position allocation of the plurality of LEDs with parallel connection is as shown in FIG. 2 and FIG. 3. The structure of the cylinder shell 31 is a cylinder with a diameter D2. The diffuser interface 32 is a circular object with a diameter D2. Therefore, when the test light is diffused to the outside of the photo-mask 41 from the diffuser interface, the irradiation range is a circular area with a diameter D2 which is on the diffuser interface.

Moreover, the test apparatus disclosed by the present invention further includes the closed shell 40 as shown in FIG. 4. The closed shell 40 is an opaque material for preventing the outside light beam and is for disposing the light source 10, the photo-mask 41, the sensor bearing area 51 and the light sensor 52. In addition, the test apparatus further includes a processor (not shown) for receiving the test data generated by the light sensor 52. The test data is further processed to determine the quality of the light sensor 52. The light sensor 52 is a CCD or a CMOS photodiode.

Figure 6:
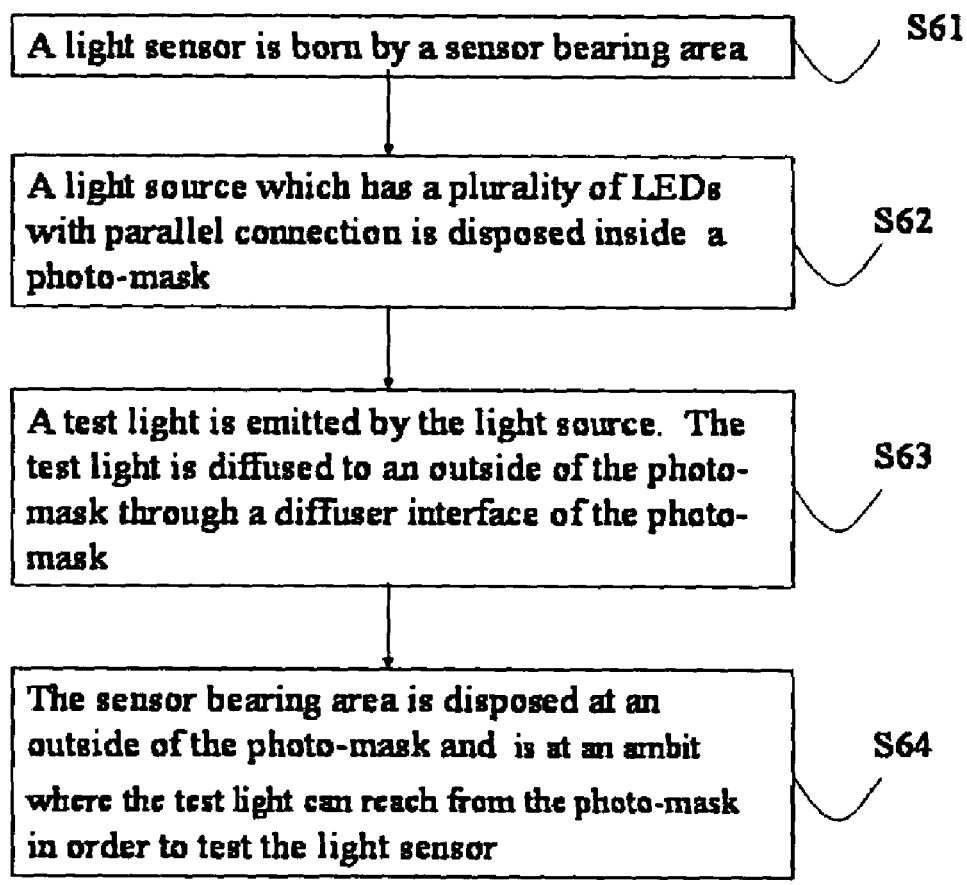
FIG. 6 is a flowchart illustrating a test method according to an embodiment of the present invention.

Referring to FIG. 6, a flowchart illustrates a test method according to an embodiment of the present invention. The method includes steps as follows:

Step S61: A light sensor is born by a sensor bearing area.

Step S62: A light source which has a plurality of LEDs with parallel connection is disposed inside a photo-mask.

Step S63: A test light is emitted by the light source. The test light is diffused to the outside of the photo-mask through a diffuser interface of the photo-mask.

Step S64: The sensor bearing area is disposed at the outside of the photo-mask and is at an ambit where the test light can reach from the photo-mask in order to test the light sensor.

The test method further includes utilizing an opaque closed shell to dispose the light source, the photo-mask, the sensor bearing area and the light sensor. Furthermore, a Lux meter is used to adjust the test light diffused from the diffuser interface. The light source further includes the adjustment unit for fine tuning the brightness of the test light while adjusting. In step S63, the test light could be diffused to the outside of the photo-mask through the diffuser interface. After step S64, a processor is further used to receive the test data generated by the light sensor and the responsivity of the light sensor is then determined. The light sensor is a CCD or a CMOS photodiode. The LED is WLED. The number of the WLED has better to be seven. The position allocation is that one WLED is surrounded by six WLED. The spacing between any two WLED is equivalence. The photo-mask does not only include the diffuser interface; but also includes a shell which is made by a smooth black material. The shell is for surrounding the diffuser interface and the light source.

Although the features and advantages of the embodiments according to the preferred invention are disclosed, it is not limited to the embodiments described above, but encompasses any and all modifications and changes within the spirit and scope of the following claims.

What is claimed is:

1. A test apparatus for use in testing a light sensor, comprising:
   a light source having a plurality of light emitting diodes (LEDs) with parallel connection for emitting a test light;
   a photo-mask having at least one diffuser interface, said light source disposed inside said photo-mask, said test light being guided to the outside of said photo-mask through said diffuser interface; and
   a sensor bearing area disposed at the outside of said photo-mask and being at an ambit to allow said test light to reach from said photo-mask so as to bear said light sensor;
   wherein said test light emitted by said light source is diffused by said diffuser interface to an allocation area of said light sensor for testing said light sensor.

2. The test apparatus of claim 1, wherein said test apparatus further includes a closed shell, and said closed shell is an opaque material for disposing said light source, said photo-mask, said sensor bearing area and said light sensor.

3. The test apparatus of claim 1, wherein said test apparatus further includes a processor for receiving a test data generated by said light sensor, and for processing said test data to determine a quality of said light sensor.

4. The test apparatus of claim 1, wherein said light sensor is a charge coupled device (CCD) or a complementary metal-oxide semiconductor (CMOS) photodiode.

5. The test apparatus of claim 1, wherein said photo-mask further includes at least one shell, and an inside of said shell is a smooth black material for surrounding said diffuser interface and said light source.

6. The test apparatus of claim 1, wherein said plurality of light emitting diodes is white light emitting diodes (WLEDs).

7. The test apparatus of claim 6, wherein said light source includes seven-WLEDs with parallel connection, and said seven-WLEDs receive working current provided by a power supply port to emit said test light.

8. The test apparatus of claim 7, wherein a position allocation of said seven-WLED is that one WLED is surrounded by six WLED, and spacing between any two WLEDs is equivalence.

9. The test apparatus of claim 1, wherein said light source has an adjustment unit for adjusting brightness of said test light.

10. The test apparatus of claim 1, wherein said diffuser interface is used to allow said test light to diffuse to the outside of said photo-mask.

11. A light source of testing a light sensor for use in a test apparatus for receiving working current of a power supply port to generate a test light required by said test apparatus testing said light sensor, said light source comprising: an adjustment unit controlled amperes of said working current to adjust brightness of said test light; and a plurality of LEDs, said plurality of LEDs being parallel connection, said plurality of LEDs received said working current through said adjustment unit in order to emit said test light; wherein said test apparatus further includes a photo-mask, a sensor bearing area, a closed shell and a processor.

12. The light source of testing a light sensor of claim 11, wherein said sensor is a CCD or a CMOS photodiode.

13. The light source of testing a light sensor of claim 11, wherein said closed shell is an opaque material for disposing said light source, said photo-mask, said sensor bearing area and said light sensor.

14. The light source of testing a light sensor of claim 11, wherein said processor is for receiving a test data generated by said sensor, and a quality of said light sensor is determined based on said test data.

15. The light source of testing a light sensor of claim 11, wherein said plurality of LEDs is WLED.

16. The light source of testing a light sensor of claim 15, wherein said plurality of LEDs is seven WLEDs with parallel connection.

17. The light source of testing a light sensor of claim 16, wherein a position allocation of said seven WLEDs is that one WLED is surrounded by six WLEDs, and spacing between any two WLEDs is equivalence.

18. The light source of testing a light sensor of claim 11, wherein said adjustment unit has a plurality of variable resistors, and said plurality of variable resistors is parallel connection.

19. A test method for use in testing a light sensor, comprising:
   bearing said light sensor through a sensor bearing area;
   emitting a test light through a light source, said light source having a plurality of LEDs with parallel connection, said light source disposed inside a photo-mask; emitting said test light to the outside of said photo-mask through at least one diffuser interface of said photo-mask; and
   testing said light sensor through said sensor bearing area disposing at the outside of said photo-mask and said sensor bearing area being at an ambit to allow said test light to reach from said photo-mask.

20. The test method of claim 19, further comprising utilizing a closed shell to dispose said light source, said photo-mask, said sensor bearing area and said light sensor, wherein said closed shell is an opaque material.

21. The test method of claim 19, further comprising utilizing a processor to receive test data generated by said light sensor, wherein a quality of sensor is determined based on said test data.

22. The test method of claim 19, further comprising providing a CCD or a CMOS photodiode to be said light sensor.

23. The test method of claim 19, further comprising providing at least one shell to be said photo-mask, wherein an inside of said shell is a smooth black material for surrounding said diffuser interface and said light source.

24. The test method of claim 19, further comprising providing WLED to be said plurality of LEDs.

25. The test method of claim 24, further comprising providing seven-WLEDs with parallel connection to be said plurality of LEDs with parallel connection, wherein said seven-WLEDs receive working current provided by a power supply port to emit said test light.

* * * * *